United States Patent [19]

Bodlovic

[11] 4,447,088
[45] May 8, 1984

[54] ARTICULATED LUGGAGE CARRIER

[76] Inventor: Tonko Bodlovic, 206 Ellery Pl., San Pedro, Calif. 90732

[21] Appl. No.: 310,094

[22] Filed: Oct. 9, 1981

[51] Int. Cl.³ .................................................. B62J 7/04
[52] U.S. Cl. ........................... 297/217; 297/DIG. 9; 224/31; 280/289 A
[58] Field of Search ............... 297/383, 191, 192, 217, 297/452, DIG. 9; 224/275, 31; 280/289

[56] References Cited

U.S. PATENT DOCUMENTS

| | | | |
|---|---|---|---|
| 1,216,029 | 2/1917 | Whitaker | 297/DIG. 9 |
| 3,029,106 | 4/1962 | McGuire | 297/217 |
| 3,486,767 | 12/1969 | Lujan | 297/DIG. 9 |
| 3,850,353 | 11/1974 | Foulds | 297/DIG. 9 X |
| 3,899,209 | 8/1975 | Schulz | 297/383 |
| 3,901,534 | 8/1975 | Popken | 297/DIG. 9 X |
| 4,030,750 | 6/1977 | Abram | 297/DIG. 9 X |
| 4,111,448 | 9/1978 | Sklodowsky | 297/DIG. 9 X |

FOREIGN PATENT DOCUMENTS 74014  4/1952  Denmark ........................... 224/31

Primary Examiner—Ramon S. Britts
Assistant Examiner—Peter A. Aschenbrenner
Attorney, Agent, or Firm—Roger A. Marrs

[57] ABSTRACT

A luggage carrier is disclosed herein mountable on the rear rack of a motorcycle which includes a base frame for supporting an article of luggage and an articulated frame which is selectively movable between a first position and a second position. A backrest is resiliently carried on the articulated frame so that the backrest may either support the back of a passenger when the frame is in its first position or support the driver's back when the frame is in its second position. The articulated frame includes an over-the-center toggle mechanism for resiliently and yieldably maintaining the frame and the backrest in its selected position. Releasable fasteners hold the articulated frame in its first position and a releasable locking mechanism holds the backrest in its respective operative positions.

9 Claims, 12 Drawing Figures

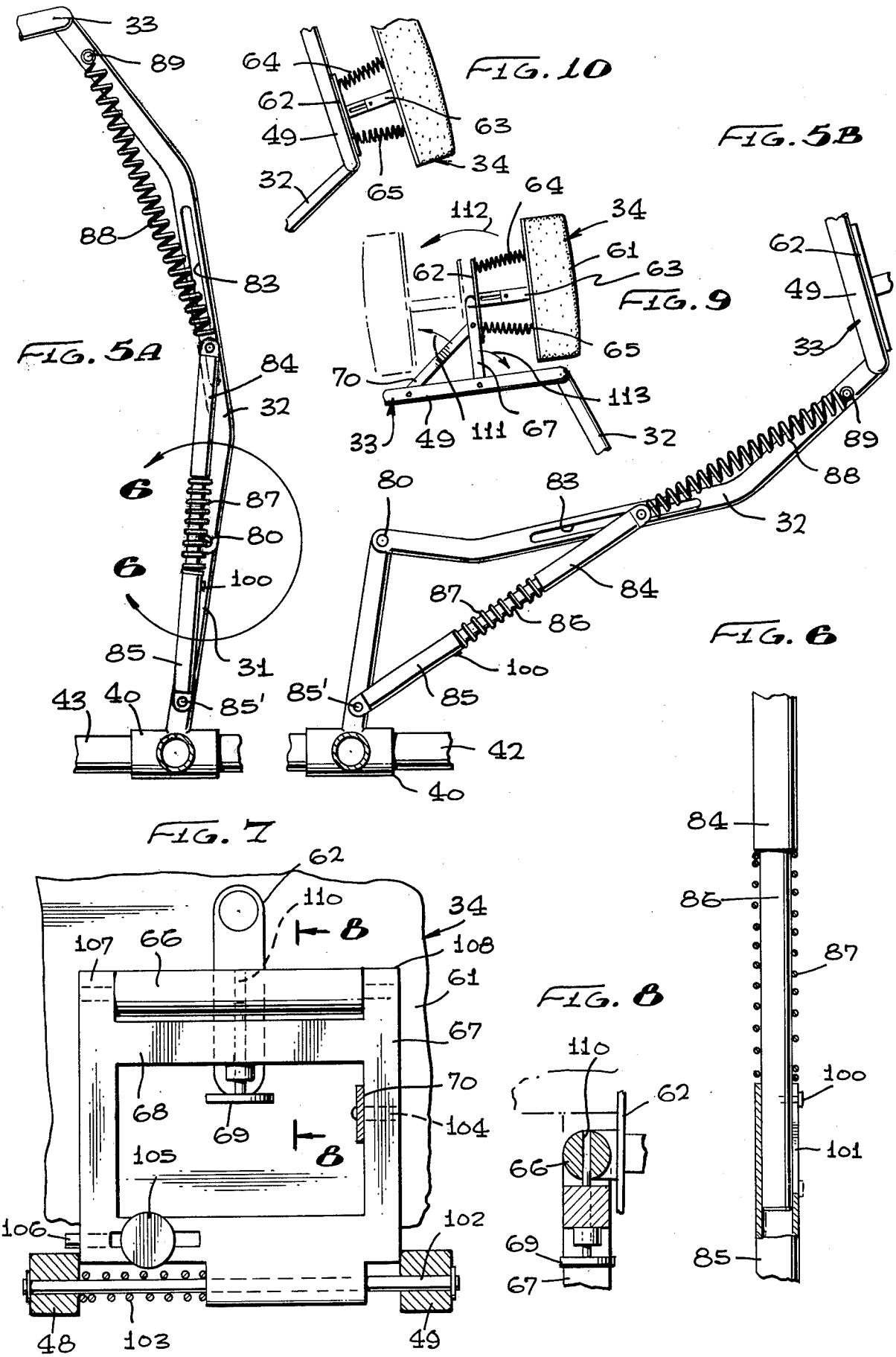

ARTICULATED LUGGAGE CARRIER

BACKGROUND OF THE INVENTION

1. Field of the Invention

The present invention relates to articulated luggage carriers and more particularly to a novel such carrier having a backrest which is adapted to support the back of either a passenger or a driver of a motorcycle depending upon the position of the articulated carrier.

2. Brief Description of the Prior Art

In the past, it has been the conventional practice to attach a variety of luggage supports or carriers onto the frame of motorcycles or the like so that a variety of personal luggage and equipment can be carried thereon. Usually, conventional luggage carriers are fixedly supported to the frame of the motorcycle immediately behind the seat so that the weight of the luggage or equipment being carried is substantially over the rear wheel of the vehicle. Sometimes, the passenger, who sits on the seat immediately behind the driver, may use the luggage as a back support during travel of the motorcycle. In other instances, fixed bars are carried on the motorcycle frame against which the passenger may lean so as to support his back.

Although such arrangements have been successful for their intended purposes, it is obvious that the back of the driver cannot be supported by either the luggage, fixed bars or the like since a substantial distance is defined between the luggage carrier and the back of the driver. Such space is usually occupied by the passenger and when unoccupied, no useful purpose is served.

Some attempts have been made to provide a back support for the driver which take the form of extendable rods or mechanisms which are supported from the luggage rack and which include a cushioned backrest against which the driver may bear. However, such extendable mechanisms suffer from the difficulty that the backrest is too rigid for comfortably supporting the driver's back. Also, such extensions do not readily accommodate the holding of any additional luggage or equipment.

Therefore, a longstanding need has existed to provide a new luggage rack for motorcycles or the like which not only is adapted for supporting additional pieces of luggage or equipment, but which will provide a backrest for either the passenger or the driver so that either rider is comfortably supported.

SUMMARY OF THE INVENTION

Accordingly, the above problems and difficulties are obviated by the present invention which provides a novel luggage carrier adapted to be carrier on the rear rack of a motorcycle which includes a base frame for supporting a first article of luggage and an articulated frame movably carried thereon for supporting a second article of luggage. The articulated frame is selectively movable between a first position and a second position while an overdash center toggle mechanism is employed for yieldably biasing the articulated frame in either of the two positions. Backrest means are resiliently carried on the articulated frame so that the backrest means may either support the back of a passenger when the frame is in its first position or supports the driver's back when the frame is in its second position. Releasable fastener means and locking means are provided for the articulated frame and the backrest means for releasably holding the articulated frame and the backrest means in their respective operative positions.

Therefore, it is among the primary objects of the present invention to provide a novel articulated luggage carrier for motorcycles or the like which permits the inclusion of additional pieces of luggage or equipment to be carried on the motorcycle.

Another object of the present invention is to provide a novel articulated luggage carrier which includes backrest means adapted to be positioned for use by either the driver or his passenger.

Another object of the present invention is to provide a novel articulated luggage carrier for motorcycles which may be readily mounted on the frame of the motorcycle and which includes an articulated frame adapted to be positioned for supporting the back of the driver or his passenger.

Yet another object of the present invention is to provide a novel articulated luggage carrier which includes a backrest means adapted to be extended between a position for supporting the back of a passenger and a position for supporting the back of the driver.

Yet a further object of the present invention is to provide a novel articulated luggage carrier for motorcycles which is useful for carrying additional items of luggage, serves as a backrest for either the passenger or the driver and which may be readily mounted on a conventional carrier rack included on the frame of a motorcycle.

BRIEF DESCRIPTION OF THE DRAWINGS

The features of the present invention which are believed to be novel are set forth with particularity in the appended claims. The present invention, both as to its organization and manner of operation, together with further objects and advantages thereof, may best be understood by reference to the following description, taken in connection with the accompanying drawings in which:

FIGS. 3A and 3B are fragmentary elevational views of the luggage rack shown in FIG. 2 as taken in the direction of arrows 3A—3A wherein FIG. 3A illustrates a locked position and FIG. 3B illustrates an unlocked position;

FIGS. 5A and 5B are side elevational views of the overcenter toggle mechanism employed to yieldably hold the articulated frame in either of its two positions;

FIG. 6 is an enlarged elevational view, partly in section, of the overcenter toggle mechanism shown in FIG. 5A as taken in the direction of arrows 6—6 thereof;

FIG. 7 is an enlarged elevational view of the backrest means shown in FIG. 2 as taken in the direction of arrows 7—7 thereof;

FIG. 8 is a fragmentary view, partly in section, of the locking means used on the headrest means of FIG. 7 as taken in the direction of arrows 8—8 thereof;

FIG. 9 is a side elevational view of the backrest means illustrated in its first position for supporting the back of a passenger as shown in solid lines in FIGS. 1 and 2; and FIG. 10 is a view similar to the view of FIG. 9 illustrating the backrest means in the position for supporting the back of the driver as shown in broken lines in FIG. 1.

DESCRIPTION OF THE PREFERRED EMBODIMENT

Figure 1:
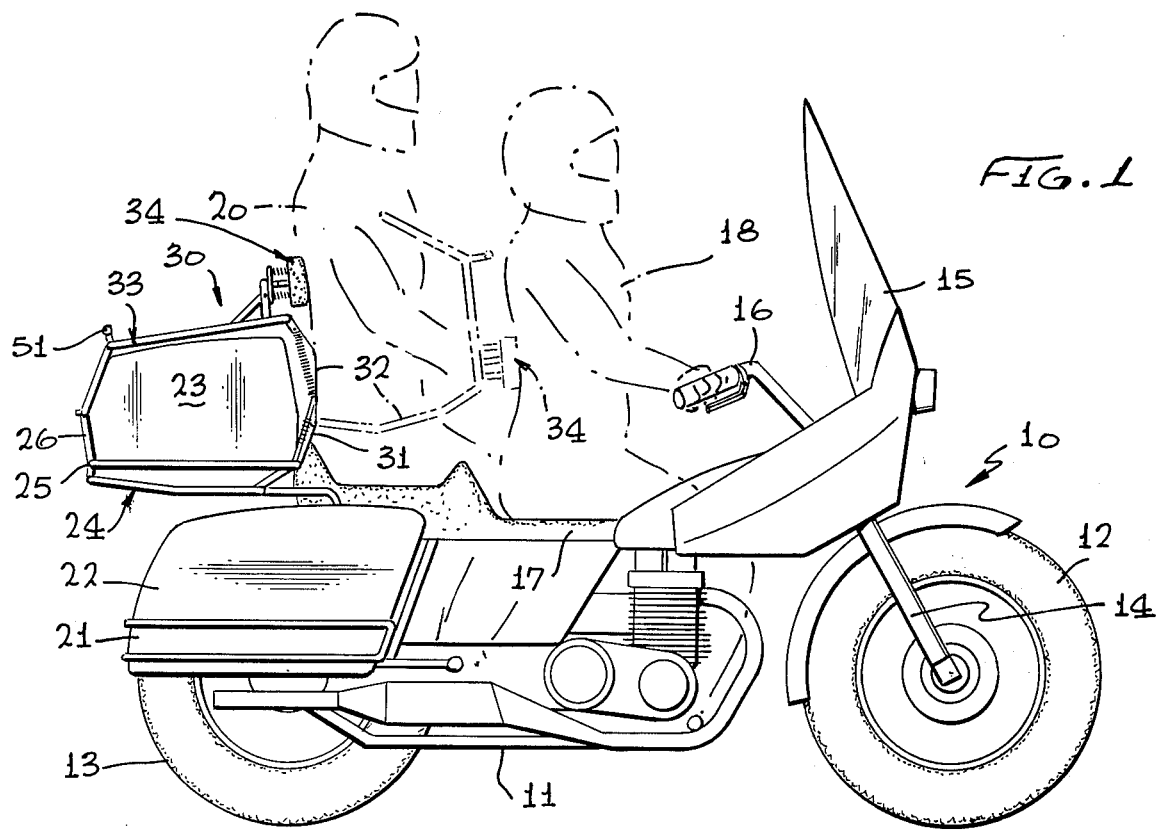
FIG. 1 a side elevational view of a conventional motorcycle incorporating the novel articulated luggage carrier of the present invention.

Referring to FIG. 1, a conventional motorcycle is illustrated in the general direction of arrow 10 which includes a conventional frame 11 for rollably supporting a front wheel 12 and a rear wheel 13. The front wheel 12 is carried on the frame via a front steering means generally indicated by numeral 14 and which includes a windshield 15 and a set of handlebars 16. The top of the frame is employed for supporting an elongated seat 17 so that a driver 18 may sit on the front portion thereof and a passenger 20 may sit on the rear portion thereof.

As is the convention practice, side luggage is carried on side racks 21 which are rigidly supported to a portion of the frame 11 and the luggage is illustrated by numeral 22. It is to be understood that luggage 22 may take the form of storage boxes, suitcases, bedrolls or other pieces of luggage or equipment intended to be carried on the motorcycle 10 by means of the side racks 21. Also, it is to be noted that an additional storage box or luggage indicated by numeral 23 is supported on a fixed rack 24 which is firmly secured to the frame 11 in addition to the side racks 21. The luggage rack 24 includes a side rail 25 extending around the periphery thereof for supporting the sides of the storage box 23. The side rail 25 includes an upwardly projecting extension 26.

In accordance with the present invention, an articulated frame indicated in the general direction of arrow 30 is carried on the fixed frame 24 by means of fixed links 31 on each side of the frame 24 which are pivotally mounted to moving links 32 which, in turn, merge with a rack portion 33. A rack portion 33 may be employed for supporting additional luggage and it can be seen, in FIG. 1, that the articulated frame 30 may be maintained in its position shown in solid lines so that a backrest means 34 can support the back of passenger 20 or the articulated frame 30 may be moved to the position shown in broken lines so that the backrest means 34 will support the back of the driver 18.

Figure 2:
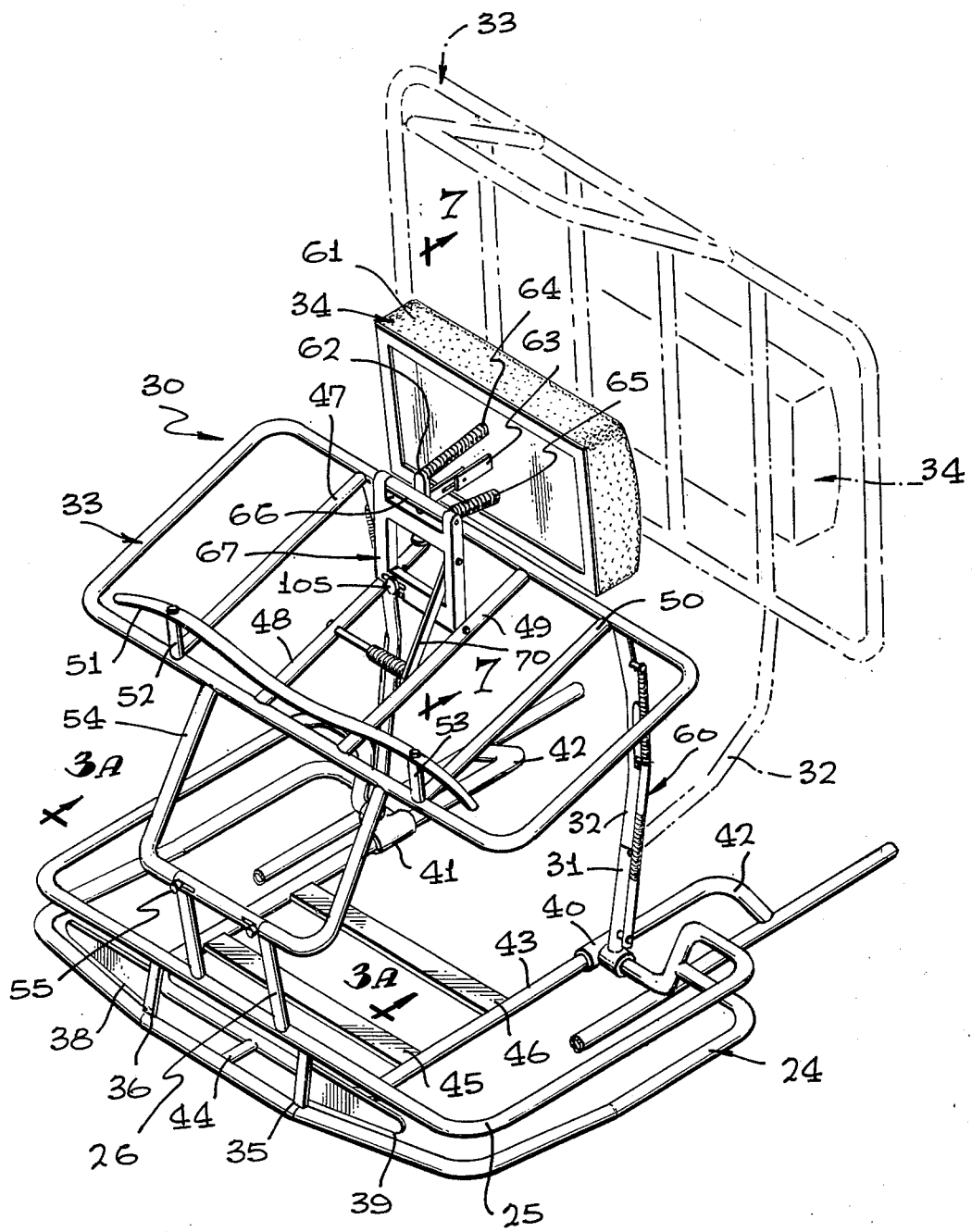
FIG. 2 is an enlarged perspective view of the novel articulated luggage carrier of the present invention as shown in FIG. 1.

Referring now in detail to FIG. 2, the novel articulated luggage carrier of the present invention is illustrated in broken lines wherein the articulated frame is in position so that the headrest means 34 supports the driver while the articulated frame is in solid lines when the backrest means is in position for supporting the back of the passenger. The fixed or stationary frame 24 extends from one side around the end and to the other side of the vehicle and the railing 25 follows the same contour and shape. Standoffs 35 and 36 maintain the rail in fixed spaced apart relationship with respect to the frame 24 and reflectors 38 and 39 may be incorporated thereon. The adjacent ends of the rail 25 and the frame 24 terminate in a fitting 40 associated with one side of the venhicle and fitting 41 associated with the opposite side. Each fitting is joined to the respective portion of the frame 11 via a curved portion 42 and the fittings 40 and 41 also are connected to the frame 24 via a U-shaped bracket 43 which is connected to the frame 24 via support piece 44. A pair of support bars 45 and 46 are connected to the sub-frame or brace 43 so that they are arranged in fixed spaced apart relationship and may be readily available for supporting a piece of luggage or other equipment intended to be carried thereon.

With respect to the articulated frame 33, it can be seen that the frame comprises an endless tube construction which is formed in a rectangular geometry and that a plurality of support bars 47, 48, 49 and 50 are arranged in fixed parallel spaced apart relationship across the width of the rectangular frame. Also, a luggage support 51 is provided which includes an elongated bar 51 which is carried on the rear length of the frame by means of standoffs 52 and 53. Therefore, when luggage is placed on top of the articulated frame, it may bear against the support bar 51.

A downwardly depending U-shaped member 54 is carried on the rear length of the frame 33 and includes a releasable latch or lock means 55 which is releasably engagable with the upwardly projecting extension 26. When the articulated frame 30 is in the position shown in solid lines, the latch means 55 is in engagement with the extension 26 so that a rigid support and construction is produced.

Fixed links 31 and moving links 32 support the opposite end of the articulated frame and by means of an overcenter toggle mechanism broadly indicated by numeral 60, the links are maintained in either the position shown in solid lines or the position shown in broken lines. The details of the overcenter toggle mechanism will be described later.

The backrest means 34 includes a cushioned pad 61 carried on a vertically disposed plate 62 via a sliding link construction indicated by numeral 63. A pair of springs 64 and 65 permit resilient movement of the cushioned pad 61 with respect to the fixed structure of the frame so that the back of either the passenger or the driver of the vehicle will be adequately supported even though the curvature of the backs may differ or the person being supported moves slightly. The support plate 62 is carried on a rotatable member 66 which is pivotally carried in a yoke defined by the opposite ends of a U-shaped structure broadly identified by numeral 67. A crossbar 68 supports a screw mechanism 69 suitable for holding the rotatable element 66 in one of two positions. Such construction and the positions will be described later. As shown in solid lines, when the U-shaped structure 67 is in the upright position, support is given by a movable bracket 70.

Figure 3A:
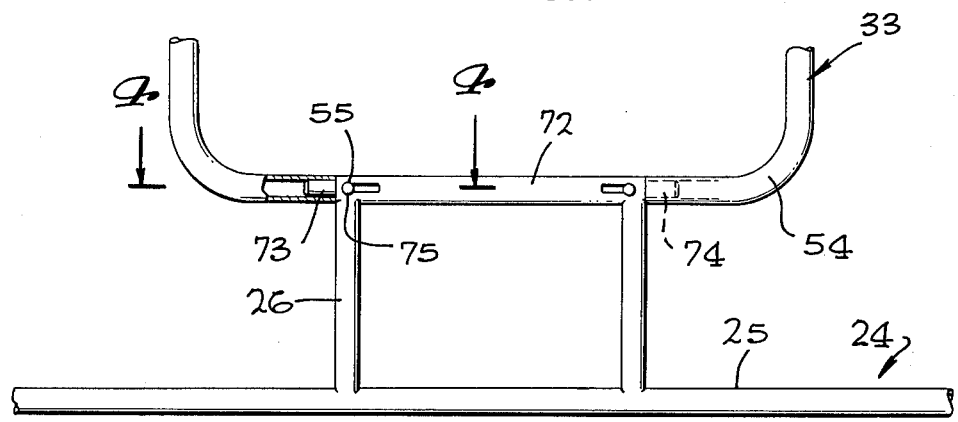
Figure 3B:
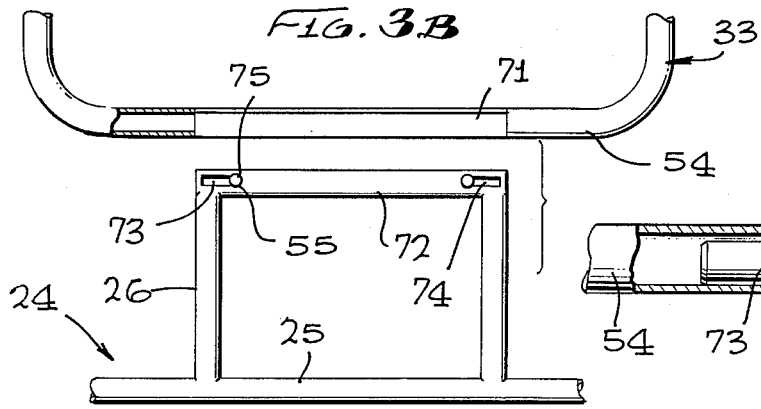

Referring now in detail to FIGS. 3A and 3B, the releasable attachment of the articulated frame 33 to the fixed frame 24 is illustrated wherein it can be seen that the releasable fastener 55 detachably connects with the upwardly projecting extension 26 carried on the fixed frame rail 25. As illustrated in FIG. 3A, attachment is achieved by a semi-circular portion 71, as shown in FIG. 3B, which is received over a tube portion 72 so that sliding latches 73 and 74 associated with opposite sides of the connection can project into the bore of the tube forming the frame 54. As shown in FIG. 3B, the latches 73 and 74 have been retracted into the tube 72 so that they are removed from the bore of the tubing forming frame 54. This releases the U-shaped member 54 carried on frame 33 so that the frame 33 can be pivoted.

Figure 4:
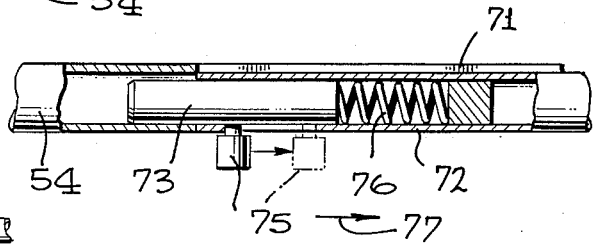
FIG. 4 is an enlarged fragmentary, sectional view of the locking mechanism shown in FIG. 3A as taken in the direction of arrows 4—4 thereof.

In FIG. 4, the latch 73 is illustrated and the latch is in position with the member 54 so as to prevent movement of the frame 33. The latch 73 includes a nob 75 which slides through a notch in the tube 72 by manual operation. A spring 76 is incorporated into the construction for normally biasing the latch 73 into engagement with the member 54. When the nob 75 is moved in the direction of arrow 77, the nob will be in the position shown in broken lines against the expanding tension of the spring 76 and the latch 73 will be removed from engagement with the member 54.

Referring now in detail to FIG. 5A, an enlargement of the overcenter toggle mechanism is illustrated wherein it can be seen that the fixed link 31 is secured at one end to the fitting 40 and is pivotally attached to one end of the movable link 32 by means of pivot 80. The opposite end of movable link 32 is fixedly attached to the frame 33 so that the frame and the moving link 32 move as a unit. Moving link 32 incorporates a centrally located slot 83 which slidably receives one end of a member 84. A similar member 85 is pivotally attached to the fixed member 31 by means of pivot 85. A rod 86 is mounted between the members 84 and 85 and a spring 87 is contracted between the opposite ends of the members 84 and 85 about the rod 86. A spring 88 is coupled at one end to the end of member 84 and at its opposite end to a pin 89 carried on the end of link 32 adjacent to its fixed connection with the frame 33. Therefore, it can be seen that the members 84 and 85 along with springs 87 and 88 form an overcenter biasing mechanism which operates in conjunction with the links 31 and 32 to bias the links into a first position as shown in FIG. 5A or a second position as shown in FIG. 5B. In the former position, the articulated frame 33 is as shown in solid lines in FIG. 2 while the latter position is the position of the articulated frame 33 in the broken lines showing in FIG. 2.

FIG. 6 more clearly shows the construction of the members 84 and 85 and the spring 86 which is mounted on the rod 87. Also, it can be seen that movement is limited by means of a stop pin 100 which is carried on the rod 86 and moves through the length of a slot 101. Movement is limited by engagement of the pin 100 with the opposite ends of the slot defined by the member 85.

Referring now to FIG. 7, it can be seen that the backrest means 34 includes the yoke 67 which is pivotally carried on a rod 102 extending between the support bars 48 and 49. The yoke is biased by means of spring 103 and, as noted previously, the yoke is maintained in an upright position as shown in solid lines in FIG. 2 by means of the brace 70 which incorporates a hook at one end that is engaged with a pin 104 outwardly projecting from the yoke 67. When it is desired to lower the yoke 67, the brace 70 is unhooked from the pin 104 and pivoted downwardly between the support bars 48 and 49. At this time, the slide pin 105 is actuated so that the yoke will fit between the bars and when the slide is released, the end 106 of the slide pin will enter a corresponding hole in support bar 48 so that the yoke will be maintained in the down position.

It is also to be noted that the cushion 61 can be rotated between the legs of the yoke 67 wherein the legs are identified by numerals 107 and 108 respectively. The rotatable member 66 is pivotally arranged between the yoke legs 107 and 108 and when it is desired that the cushion 61 be in the position shown in solid lines in FIG. 2, the rotating pin 69 is positioned into a corresponding end of hole 110 in the rotatable member 66. However, when it is desired that the cushion 61 be placed in the position shown in broken lines in FIG. 2, the pin 69 is removed from its hole and the rotating member 66 is rotated until 180 degrees the opposite opening to the hole is in alignment with the pin 69 so that engagement can take place. Such engagement will then hold the cushion 61 in the position indicated in broken lines in FIG. 2.

In FIG. 8, the arrangement of the hole is such that the opposite openings to the hole 110 alternately relieve pin 69. Therefore, it can be seen that when the rotatable member 66 is rotated between the yoke legs 107 and 108, the user can turn the thumb nut of the pin 69 so as to introduce the pin into either end of the hole depending on the desired position of the articulated frame and the backrest 61.

For example, when it is desired to employ the backrest means 34 for supporting the back of the passenger, the articulated frame 30 is in the position shown in solid lines in FIGS. 1 and 2 wherein the member 54 is attached to the upwardly projecting extension 26 of the fixed frame 24. The backrest cushion 61 is positioned to the solid line showing in FIG. 9 with the yoke 67 in its upright position and supported by the brace 70. The pin 69 is introduced into the aperture or hole 110 as shown in FIGS. 7 and 8. However, when it is desired to move the articulated frame 30 into its extended or second position, the backrest means 34 must be re-positioned so as to properly support the back of the driver 18. Therefore, the brace 70 is removed by unhooking the brace from its in connection with the yoke 67 and rotated in the direction of arrow 111 so that the brace is out of the way. Secondly, the pin 69 is removed from hole 110 and the rotating member 66 is rotated to align the pin 69 with the opposite opening of the hole followed by the fastening of the pin 69 into the hole to retain the rotating member and the cushion 61 in the position shown in broken lines in FIG. 9. The headrest has now been moved in the direction of arrow 112. At this time, the yoke 67 is moved in the direction of arrow 113 so that the yoke is positioned between the supporting bars 48 and 49 and secured thereto by means of pin 106. The cushion 61 now assumes the position as shown in FIG. 10 and is ready to support the back of the driver 18.

While particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

What is claimed is:

1. An articulated luggage carrier comprising the combination of:
   a fixed frame of U-shaped configuration having a pair of parallel spaced apart leg sections joined at one end by a cross member;
   a movable frame of rectangular configuration with respect to said fixed frame in spaced relationship;
   link means for selectively positioning said movable frame;
   said link means movably interconnected with a selected end of said movable frame to said pair of fixed frame leg sections so that said movable frame is selectively positionable between a first position with respect to said fixed frame and a second position normal to said fixed frame;
   resilient means operably carried on said link means for yieldably maintaining said movable frame in either of said first or second positions; and
   backrest means movably carried on said movable frame adjacent its selected end interconnected with said link means adapted to be moved with respect to said movable frame so as to support the back of a user regardless of said movable frame being in its first or second position.

2. The invention as defined in claim 1 wherein:
said link means comprises a fixed link and a pivotal link associated with each side of said movable and fixed frames and which are pivotal joined together in end-to-end relationship so that said pivotal link movably supports said movable frame and said fixed link is secured to said fixed frame.

3. The invention as defined in claim 2 wherein:
said resilient means is an over-center toggle mechanism having its opposite ends operably connected to said movable link and said fixed link respectively.

4. The invention as defined in claim 3 wherein:
a support member downwardly depending from the non-selected end of said movable frame; and
fastening means detachably coupling said support member to said fixed frame cross member.

5. The invention as defined in claim 4 wherein:
said backrest means includes releasable means selectively connecting a cushioned backrest to said movable frame in either of its selected positions.

6. The invention as defined in claim 5 wherein:
said backrest means further includes a yoked frame pivotally carried on said movable frame mid-way between its opposite sides;
said yoked frame pivotally mounting said cushioned backrest between a first position associated with said movable frame when in its first position and a second position associated with said movable frame when in its second position;
said cushioned backrest being perpendicular to said fixed frame when in either its first or second position.

7. The invention as defined in claim 6 including:
spring biasing means operably mounted between said yoked frame and said cushioned backrest to allow for lateral and vertical articulation thereof.

8. The invention as defined in claim 7 wherein:
said link means further includes each of said pivotal links having an elongated therein for slidably receiving joined ends of said resilient means while opposite ends of said resilient means are pivotally coupled to the opposite ends of said fixed and said pivotal links respectively.

9. The invention as defined in claim 8 wherein:
said movable frame includes cross bars for supporting items intended to be carried thereon in addition to items carried on said fixed frame.

* * * * *